United States Patent [19]
Rathert

[11] Patent Number: 5,375,967
[45] Date of Patent: Dec. 27, 1994

[54] METHOD AND APPARATUS FOR PALLETIZING AND DEPALLETIZING

[75] Inventor: Horst Rathert, Minden, Germany

[73] Assignee: Kolbus GmbH & Co. KG, Rahden, Germany

[21] Appl. No.: 986,628

[22] Filed: Dec. 4, 1992

[30] Foreign Application Priority Data

Dec. 20, 1991 [DE] Germany .............. 4142162

[51] Int. Cl.⁵ ............................. B65H 29/02
[52] U.S. Cl. .................. 414/789.5; 414/791.6; 414/793.8; 414/927
[58] Field of Search ............. 414/789.5, 791.6, 792.6, 414/799, 927, 793.8; 271/277, 204

[56] References Cited

U.S. PATENT DOCUMENTS

| | | | |
|---|---|---|---|
| 2,656,047 | 10/1953 | Samler | 414/789.5 |
| 4,552,499 | 11/1985 | Foust et al. | 414/927 |
| 4,809,965 | 3/1989 | Vander Meer et al. | 414/927 |
| 5,135,351 | 8/1992 | Rathert | 414/789.5 |
| 5,139,388 | 8/1992 | Martin | 414/799 |

FOREIGN PATENT DOCUMENTS

| | | |
|---|---|---|
| 0147319 | 7/1985 | European Pat. Off. . |
| 3612780 | 10/1987 | Germany . |
| 3718601 | 12/1988 | Germany . |
| 3720933 | 1/1989 | Germany . |
| 62-235137 | 4/1988 | Japan . |
| 2205079 | 11/1988 | United Kingdom ............. 414/791.6 |

Primary Examiner—Michael S. Huppert
Assistant Examiner—Gregory A. Morse
Attorney, Agent, or Firm—Chilton, Alix & Van Kirk

[57] ABSTRACT

The palletizing and retrieval from palletized storage of stacks of printing works products, folded sheets of paper for example, is facilitated by associating an upper and a lower interleaf sheet with each layer of stacks of the products. This provides a pair of interleaf sheets between adjacent layers of the stacks and the uppermost stack layer may be caused to slide relative to the adjacent lower stack layer by imparting a pulling force to the lower interleaf sheet associated with the stack layer to be moved while applying a restraining force to the upper interleaf sheet associated with the adjacent lower stack layer. Apparatus for use in the practice of the invention provides for withdrawing the interleaf sheets from magazines and feeding them into position as the stack layers are formed and the invention also encompasses apparatus for separating the interleaf sheets from a stack layer being retrieved from storage and directing the separated interleaf sheets to storage magazines.

18 Claims, 4 Drawing Sheets

METHOD AND APPARATUS FOR PALLETIZING AND DEPALLETIZING

BACKGROUND OF THE INVENTION

1. Field of the Invention

The present invention relates to a method of palletizing and depalletizing stacks of products in continuous, layer-by-layer succession and particularly to the storage and retrieval of stacks of thin, flexible sheet material. More specifically, this invention is directed to apparatus for delivering pre-formed stacks of flat and thin product onto pallets for temporary layered storage and for retrieving such products from storage and especially to apparatus for use in the palletizing and depalletizing of printing works products such as folded sheets of paper, periodicals, books, brochures and the like. Accordingly, the general objects of the present invention are to provide novel and approved methods and apparatus of such character.

2. Description of the Prior Art

While not limited thereto in its ability, the present invention is particularly well suited for use in connection with the production of multi-page printed publications. In the manufacture of books, brochures, periodicals and other similar products, it is in many cases necessary to store large quantities of stacked printing work products on pallets pending further processing and/or to transport such products within the printing works. While it is known in the art to employ mechanical devices for loading the pallets, the unloading of individual stacks of printing work products from palletized storage has, in the past, almost universally been wholly or partly performed manually. This manual unloading is extraordinarily labor-intensive and demands heavy physical effort. Furthermore, past experience has shown that individual printing works products that are formed into stacks cannot be prevented from shifting relative to one another during the manipulation which is incident to storage and especially during the handling associated with manual unloading. As an example of the type of manual manipulation which may result in the shifting of the individual sheets which define a stack, in order to load an assembling machine, a stacker "truck" is typically utilized for transporting stacks of folded printed sheets, temporarily stored on pallets, from the in-storage area to the feeding station of the assembling machine where the operator unloads the individual stacks from the pallet by hand.

For an example of prior art apparatus for loading printing work products onto pallets in layers, reference may be had to published German Patent Application No. 31 07 495. This published application discloses a system for depositing stacks of printed newspaper or book pages, or other similar printed matter, on a pallet so that the thin flat products in question are aligned in a specific direction. The apparatus of this published application operates on the push-off principle and includes a sliding platform onto which an assembled group of the products is transferred by means of a pusher element. The sliding platform, after being loaded, moves to a position above the pallet and, after a push-off element has been lowered behind the group of products, the sliding platform is lowered to a level which is adjacent a layer of products already present and then retracted beneath the push-off element. The end result is that the grouped products are swept on to the pallet or onto a layer of products which has already been deposited on the pallet during platform retraction.

In apparatus of the type disclosed in German Application No. 31 07 495, the overall height of the platform structure results in a relatively large difference in height between the supporting surface of the platform and the top of the pallet or the top of the layer of products already present on the pallet. Due to this height difference, the products being stacked drop through a relatively large distance when being swept off of the sliding platform. This relatively long free fall unavoidably leads to the products, which have been precisely aligned on the sliding platform in a predetermined collective arrangement conforming to a defined stacking order, shifting whereby the predetermined collective arrangement is lost. This disordering is most prevalent when the products, i.e., the book pages or the like, are thin. In fact, in the case of very thin printing works products, there is considerable risk that the sliding of adjacent sheets over one another will result in the stack becoming unstable. Since it is seldom possible to perform an aligning operation once stacking has been completed, such instability results in serious problems during destacking.

It should also be noted that, as a result of the friction that occurs between the lowermost product of a stack of product, and the supporting surface when the stack is being pushed sideways, both onto the stacking platform of the stacking apparatus and subsequently off the platform, prior art palletizing installations are incapable of fulfilling the requirement that products which are highly susceptible to damage, such as stacked portions of books or brochures, be treated with exceptional gentleness.

For a further discussion of prior art palletizing and depalletizing apparatus designed for use in a printing works, reference may be had to U.S. Pat. No. 5,135,351 which is assigned to the assignee of the present invention. The present invention constitutes an alternative to the method and apparatus of U.S. Pat. No. 5,135,351.

SUMMARY OF THE INVENTION

The present invention overcomes the above-briefly discussed and other deficiencies and disadvantages of the prior art and, in so doing, provides a novel and fully automatic method for palletizing and depalletizing stacks of substantially flat, thin products such as printing works products. The present invention also encompasses apparatus for implementing this novel method in such a manner that precise preservation of the mutual alignment of the products in a stack and the alignment of multiple stacks which may be grouped to form a row on a pallet is preserved. The method and apparatus of the present invention also guarantee that the products are treated gently during loading and unloading.

In accordance with the present invention, a flexible interleaf, typically in the form of a sheet of cardboard, is positioned on both sides of the stack(s) of printing works products which are being delivered to a pallet for temporary storage. The first of these interleaves is fed into the path of movement of the stack(s) from below in synchronism with the movement of the stack or stack row. In accordance with the preferred embodiment, the second interleaf is fed, from above and in synchronism with the movement of the incoming stack or stack row, into position on the top of the stacked printing works products. As the layers of stacks are built up on the pallet, there will be double interleaves between each successive stack layer. As a result of the use of such double interleaves, the stacks or stack rows will be conveyed onto and off of the pallet "clamped" between an upper interleaf and a lower interleaf. Accordingly, changes in the positions of the stacks and slipping of the individual products within a stack relative to one another are rendered virtually impossible, both during stacking and during later destacking. The stability resulting from practice of the present invention, in part, results from the fact that the upper interleaf associated with a stationary lower stack layer will function as a sliding surface for the interleaf which is disposed at the bottom of an adjacent, upwardly disposed stack or stacks which are being moved into or out of the storage position.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
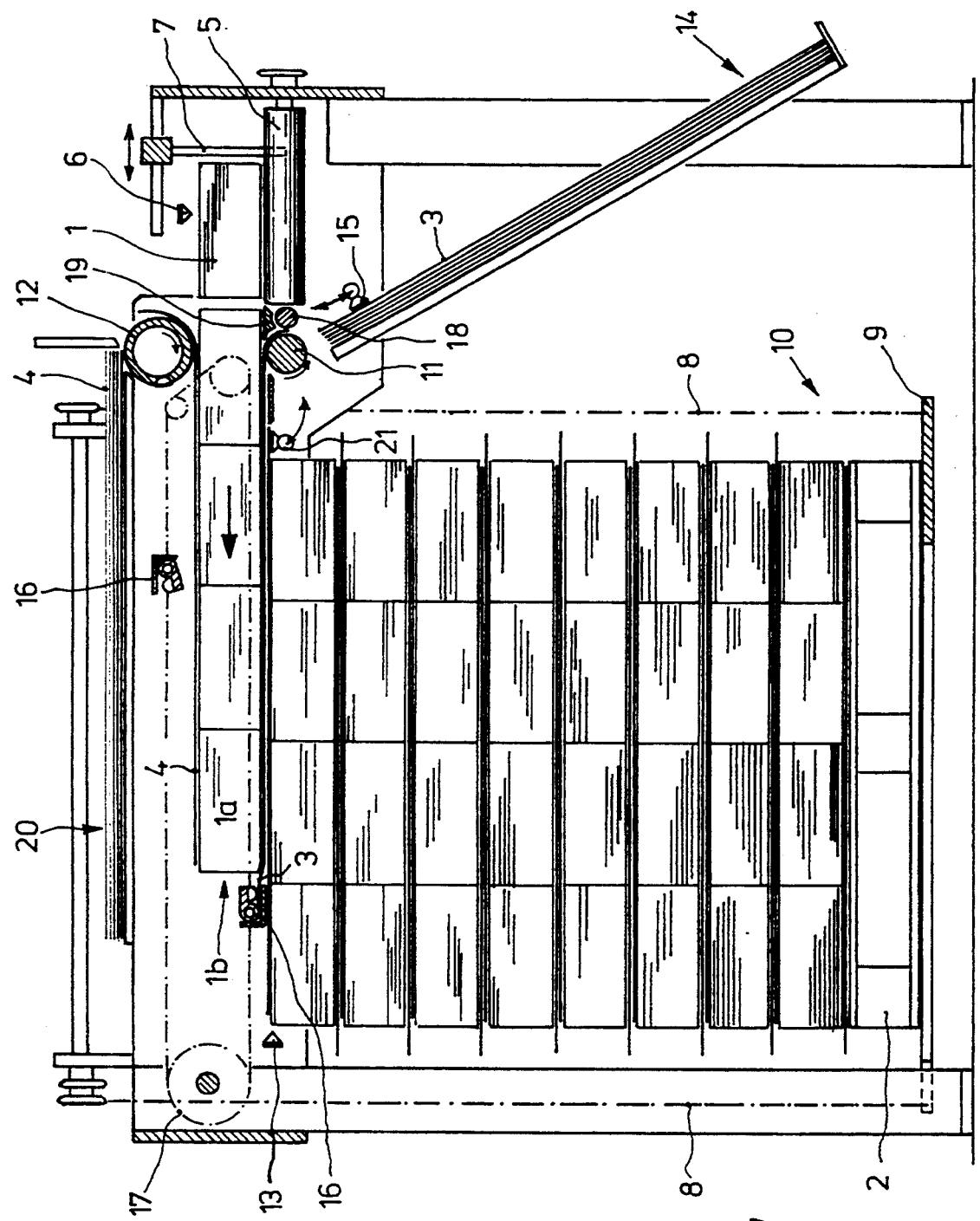
FIG. 1 is a side elevational view of apparatus for loading stacks of printing works products on to a pallet in accordance with a preferred embodiment of the invention, FIG. 1 being a view taken along line A—B of FIG. 2.
Figure 2:
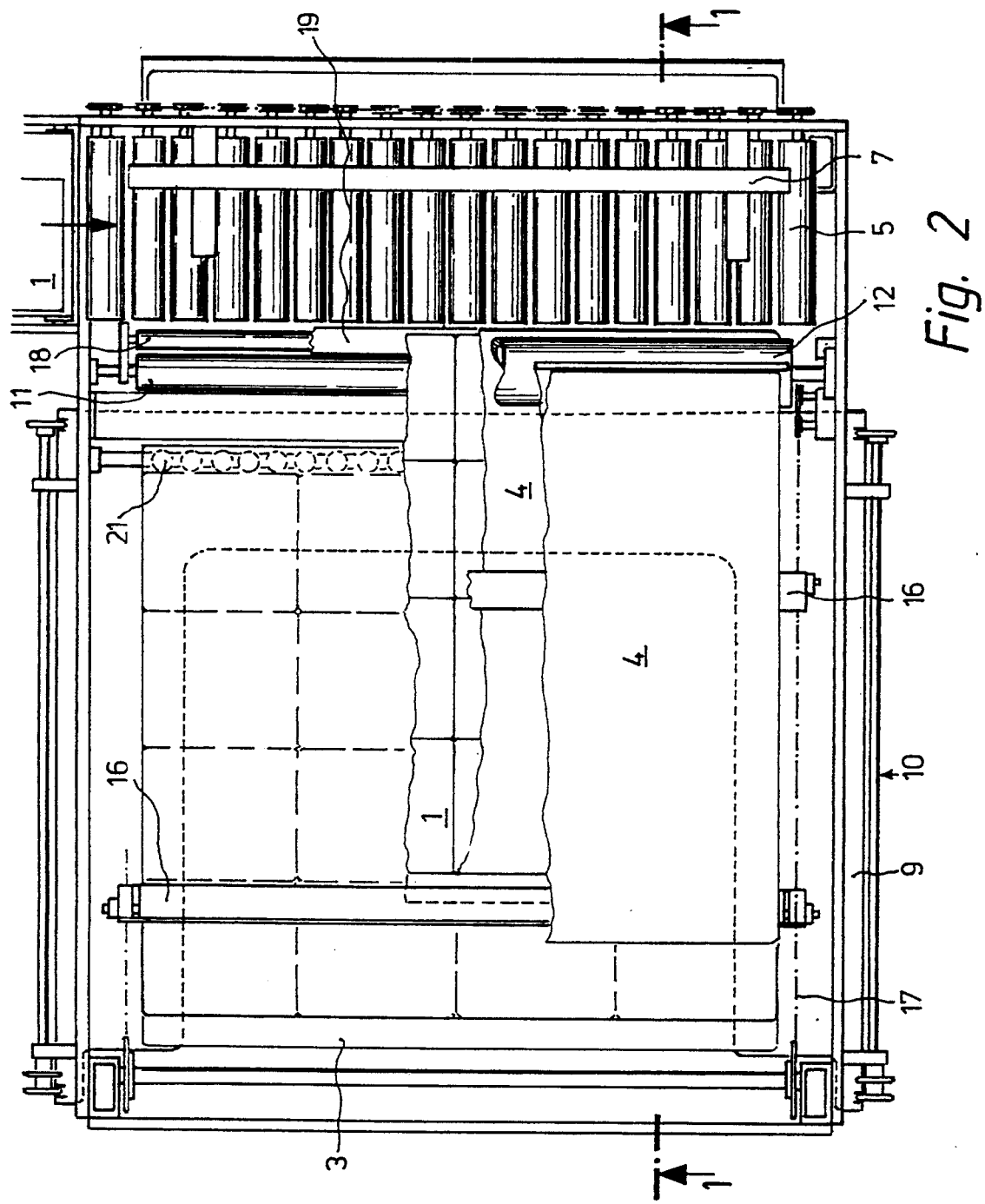
FIG. 2 is a top plan view of the apparatus of FIG. 1.

As noted above, the present invention is particularly well suited for use in the storage and subsequent retrieval of pre-formed stacks of printing works products. In the drawings, stacks of folded sheets of paper are indicated at 1. Referring to FIGS. 1 and 2, the disclosed apparatus performs the function of loading the stacks 1, in continuous, layer-by-layer succession, onto pallets, a pallet being indicated at 2. In accordance with the invention, during such loading, flexible cardboard interleaves 3 and 4 are mated with each layer of stacks, a layer of stacks being indicated generally at 1b. The infeed of the interleaves 3 and 4 is accomplished in synchronism with the movement of rows of the stacks 1, such a stack row being indicated at 1a. During the stacking process, the upper interleaf 4 associated with the next previously formed stacked layer 1b functions as a sliding surface for the layer which is being created.

As depicted in FIGS. 1 and 2, the individual stacks are fed into the disclosed apparatus via a run-in conveyor 5. Conveyor 5 is stopped when predetermined stack transfer conditions, as detected by a sensor indicated schematically at 6, have been satisfied. The sensor 6 may, for example, comprise a photoelectric device which functions as a light barrier. The stacks 1 are pushed from conveyor 5, in a direction transverse to the conveyor infeed direction, by means of the push-off device 7. Push-off device 7, which is movable in the direction indicated by the double-headed arrow on FIG. 1, will typically be employed to move an entire row of stacks simultaneously, with the length of the row being determined by the size of the pallet to be loaded.

The pallet 2 to be loaded is positioned on a lifting device, indicated generally at 10, which comprises a support plate 9 suspended on chains 8. The lifting device 10 can be operated so as to raise or lower plate 9 and the pallet 2 carried thereby.

A transport roller system is provided between the stacking location, as defined by lifting device 10, and the run-in conveyor 5. The transport roller system consists of a lower roller 11 and an upper roller 12. Rollers 11 and 12 are coupled, via associated drives, to a common drive motor. Means, not shown in the drawing, are provided to enable the position of the upper roller 12 to be adjusted in the vertical direction to thereby conform the roller position to the height of the stacks 1 of folded sheets of paper which are being received via the conveyor 5.

While stacks 1 are being received on conveyor 5, a single lower interleaf 3 is withdrawn from a magazine 14 and carried upwardly into the feed plane defined by conveyor 5. The movement of the lower interleaf sheet 3 is accomplished through the use of a gripping device 15 and by cooperation between driven roller 11 and a counter-pressure roller 18. The gripping device 15, in the disclosed embodiment, operates on the suction principal and carries the leading edge of sheet 3 into the nip of rollers 11 and 18. The rollers 11 and 18 drive the interleaf 3 in a direction defined by a curved guide plate 19. The infeed of the lower interleaf 3 will be terminated when the leading edge of the interleaf is engaged by a moveable gripping device 16. Gripping device 16, in the disclosed embodiment, is in the form of a gripper rail which is driven, so as to travel in a horizontal plane, by a chain drive 17. Movement is imparted to the chain drive 17 in synchronism with the driving of rollers 11 and 12.

A magazine 20 for storing upper interleaves 4 is positioned above the stacking location, i.e., above the lifting device 10, as shown in FIG. 1. Upper interleaf sheets 4 are individually withdrawn from magazine 20 and fed onto the stack layer 1b from above. In the disclosed embodiment, this infeed of the upper interleaf sheets 4 is accomplished by configuring upper roller 12 as a suction roller. The upper interleaves 4 are thus withdrawn from magazine 20 and rotated through a 180° change in direction as they are fed onto the stack layer 1b from above.

As may be clearly seen from FIG. 1, the lower interleaf 3, by virtue of the timing of its infeed and its engagement by the gripping device 16, is provided with a leading edge portion which projects beyond the leading edge of the first stack row 1a transferred from conveyor 5. The operation of the apparatus is timed such that the leading edge of the upper interleaf 4 is displaced from the leading edge of the lower interleaf 3 in a direction which is opposite to the direction in which the stack rows are moved while being positioned above the pallet 2. This results, for the purposes to be described below, in the upper interleaf 4 having a projecting edge portion at the opposite side of the stack layer 1b with respect to the projection of the leading edge of the lower interleaf 3.

As mentioned above, the pushing of a row 1a of the stacked printing works products 1 from the run-in conveyor 5, whereupon the stacks comprising the row are engaged by the driven transport rollers 11 and 12, and the infeeding of the cardboard interleaves 3 and 4 is affected in mutual synchronism. This synchronism is most easily acheived by having the drives for the push-off device 7 and rollers 11 and 12 coupled to a common motor. The movement of rollers 11 and 12 and the push-off device 7 will, of course, be momentarily stopped after each new stack row 1a has been transferred from conveyor 5. The interleaves 3 and 4 are each preferably caused to pass about a tight radius during the feeding thereof into position relative to the incoming stack row. After the formation of a new stack row on the conveyor 5, such row will be pushed onto the moving lower cardboard interleaf 3, the gripper mechanism 16 pulling interleaf 3 forwards in synchronism with the motion of the stack rows. Thus, the stack rows are advanced in stepwise fashion, from right to left as the apparatus is depicted in FIG. 1, until a complete stack layer 1b has been formed. The upper cardboard interleaf 4 will be advanced in synchronism with the advance of the stack rows 1a and thus will cover the stack layer 1b.

During the above-described stepwise advancing of the lower cardboard interleaf 3 associated with the stack layer 1b being formed, it has been found desirable to take steps to insure that the upper interleaf 4 of the adjacent, next lower stack layer will not be advanced because of friction between the two abutting interleaves. Accordingly, gripping means 21 is provided for preventing movement of the upper interleaf 4 of the lower stack layer. In the disclosed embodiment, the gripping means 21 is a row of suction grippers. However, other means, a gripper rail similar to gripper rail 16 for example, may be employed. As indicated by the arrow, the gripping means 21 may be moved out of the vertical plane in which the projecting edge of the upper interleafs 4 move as the support plate 9 descends.

After a complete stack layer 16 has been formed, the gripper mechanism 16 will have reached its limit of travel and will be caused to release the leading edge of the lower interleaf 3. The chain drive 17 for the gripper device 16 will, at this time, be stopped until a control signal, generated in response to output signals provided by the photoelectric sensor 6 and a further sensor 13, indicates that formation of a new stack layer is to be initiated. Also, when gripper mechanism 16 reaches its travel limit and releases interleaf 3, the lifting device 10 will lower the pallet through a predetermined distance commensurate with the height of the stacks being placed into storage. The proper vertical positioning of the pallet will be signalled by the sensor 13 which may be a further photoelectric detector 13. The opening of the gripper device 16 can be implemented in any suitable manner, i.e., by means of a cam or electromagnetic actuator.

The movements of the gripping device 21 will, of course, be synchronized with the vertical movement of the pallet. Thus, the grippers 21 will be caused to swing counterclockwise, as the apparatus is depicted in FIG. 1, as the pallet is being lowered and will then be moved back into the position shown so as to engage the projecting edge portion of the upper interleaf 4 which has been placed on the stack layer 1b just formed. At this point in time, a second gripping device 16 carried by the chain drive 17 will acquire a new lower interleaf 3 which has been extracted from magazine 14. The gripping devices 16 are positioned on the chain drive 17 such that when a first gripping device reaches its limit of movement in the infeed direction of the stack rows, the second gripping device will be in position to receive and engage a leading edge portion of an interleaf sheet 3 to be associated with the next stack layer to be formed. Upon receipt of enabling signals from the sensors 6 and 13 and engagement of a new interleaf sheet 3 by a gripping device 16, infeeding of the stack rows to form a new stack layer 1b will begin in synchronism with the movement of the lower and upper interleaves 3 and 4.

Once all of these stack layers 1b assigned to a pallet 2 have been formed on the pallet, a pallet change is carried out while a stack row 1a is running onto the conveyor 5. The pallet change comprises engaging and removing the fully loaded pallet and placing an empty pallet in the lifting device 10. The empty pallet will, after its receipt in the lifting device 10, be moved to the top stacking position where the upper edge of the pallet will be in alignment with the sensor 13 and the sensor will produce an enabling signal. As an alternative, which somewhat increases the speed of operation, the empty pallet can be delivered onto the support plate 9 at the upper or loading position by means of a guide system which has not been shown in the drawings.

Figure 3:
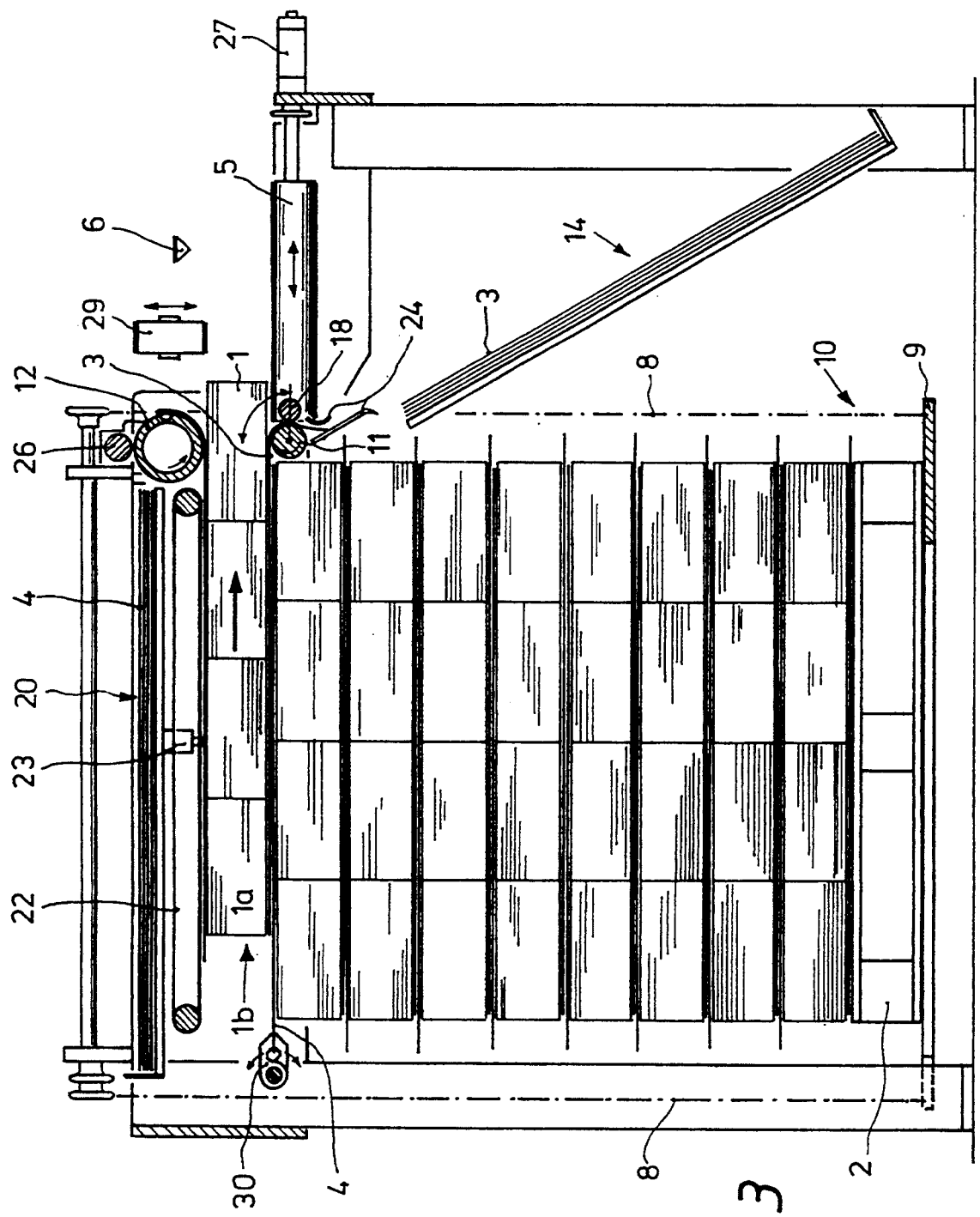
FIG. 3 is a side elevational view of apparatus for unloading stacks of printing works products from storage on a pallet in accordance with the invention, FIG. 3 being a view taken along line C—D of FIG. 4.
Figure 4:
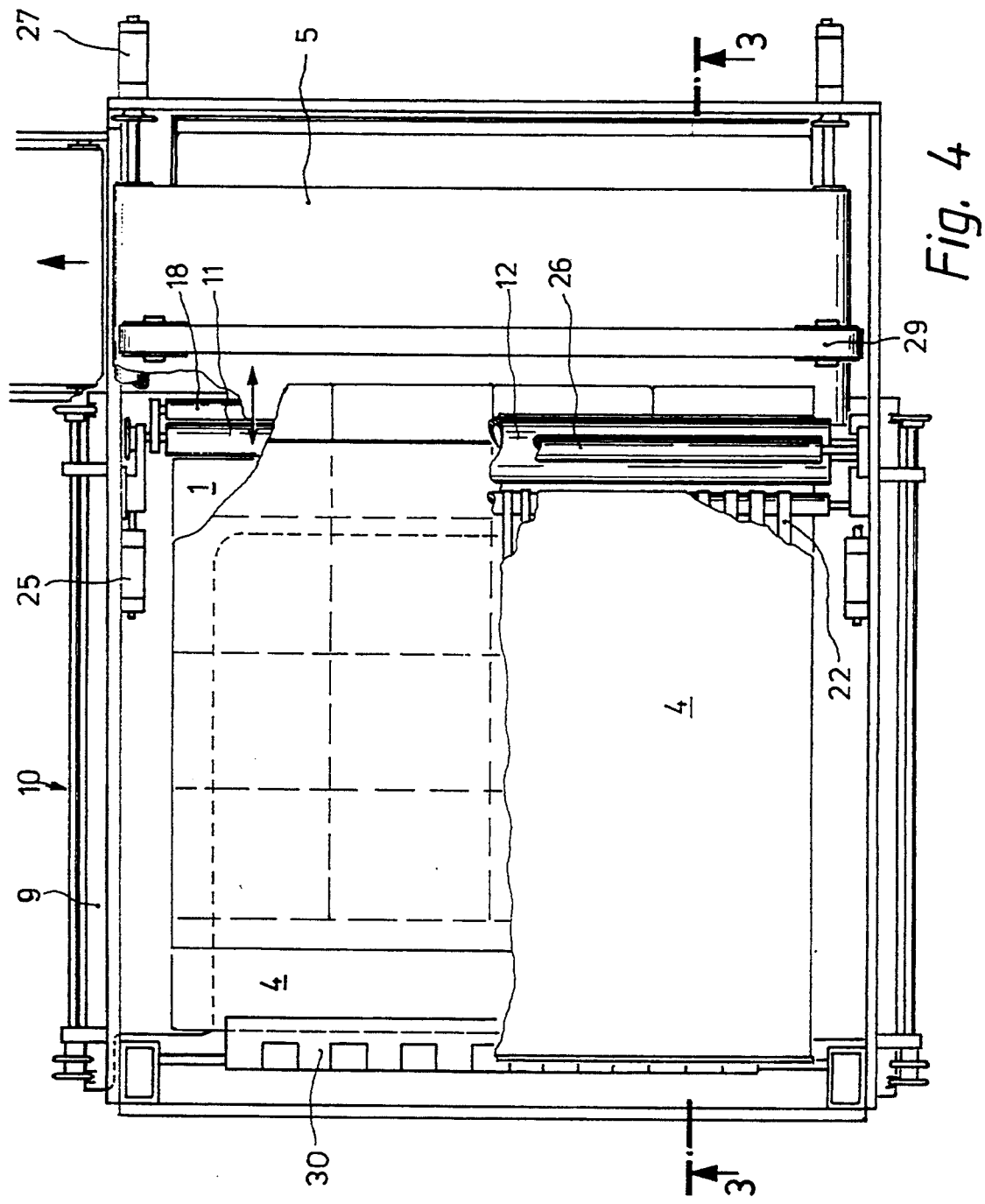
FIG. 4 is a top plan view of the apparatus of FIG. 3.

With reference to FIGS. 3 and 4, an unloading operation and the apparatus for use therein in accordance with the invention will now be described. The unloading will be accomplished in continuous layer-by-layer succession. During unloading, the lower and upper interleafs 3 and 4 are withdrawn and directed away from the stacks of printing works or products. This withdrawal of the interleaves will occur in synchronism with the movement of the rows 1a of the stack layer 1b from which the stacks 1 are being retrieved. During the movement of an upper stack layer of a multi-layer stack, the upper interleaf 4 of the stack layer immediately below the top layer from which the stacks are being removed will function as a sliding surface for the layer being removed. The stack layers are, as described above in the discussion of the formation of a multilayer stack, separated by double cardboard interleaves. During unloading, the pallet is rotated 180° relative to the orientation described above in the discussion of FIGS. 1 and 2.

The removal process starts with a loaded pallet 2 being raised by the lifting device 10 until the top stack layer makes contact with endless hold-down belts 22. The belts 22 are driven in synchronism with the stepwise movement of the stack rows 1a that comprise the stack layer 1b. The presence of a stack layer in the removal position is detected by a sensor 23 which, in the disclosed embodiment, is depicted as an electrical switch.

Upon the sensing of the presence of a stack layer 1b in the removal position, the projecting edge portion of the lower interleaf 3 of that layer will be engaged by a withdrawal roller system which comprises the driven lower transport roller 11 and a pivotally mounted counter-pressure roller 18. This engagement results from imparting downward movement to the projecting edge region of the interleaf by causing the carrier for roller 18, roller 18 being initially positioned above roller 11, to move downwardly to the position shown in FIG. 3. During this downward motions, the projecting leading edge portion of a lower interleaf 3 will be guided into a channel defined by guide plates 24. At the same time, a free wheel mechanism, rotating in its engaged direction, translates the swinging movement of roller 18 into rotation of roller 11. Since the interleaf 3 will be in the nip of rollers 18 and 11, this rotation of roller 11 will cause the interleaf 3, with its stack layer 1b positioned thereon, to be pulled forwardly through a distance such that the leading stack row 1a is positioned between rollers 11 and 12. The upper roller 12, as discussed above in the description of FIGS. 1 and 2, is configured as a suction roller. Accordingly, upper roller 12 engages the upper interleaf 4 and guides interleaf 4 through a 180° change in direction and between roller 12 and a cooperating pressure roller 26. The rotation of roller 12 will be in synchronism with the forward transport of the stack rows 1a. The lower interleaf 3, after passage between rollers 11 and 18, will be directed by guide plates 24 into magazine 14. The advancement of the lower interleaf 3 into the magazine 14 will, of course, be synchronized with the forward transport of the stack rows 1a.

During the above-described forward movement, i.e., movement of the stack rows in the direction of the arrow on FIG. 3, the stacks 1 are effectively immobilized by the upper and lower interleaves 3 and 4. Accordingly, destacking without slipping will result from the clamping action of the stacks between the interleaves. The clamping action is enhanced by the hold-down belts 22 which exert pressure on the stack rolls 1a and, accordingly, even stacks of relatively slippery products will be held together while they are being moved from a stack layer on a pallet onto conveyer 5.

The forward transport of each stack row 1a through the rollers 11 and 12 will continue until the sensor 6 produces a "stop" signal. This signal will be commensurate with a stack row 1a being positioned on conveyor 5. A space between the stack row 1a postioned on conveyor 5 and the next following stack row is insured by making conveyor 5 translatable in the direction of stack movement. Thus, as may be seen from FIGS. 3 and 4, fluidic actuators 27 are provided to impart motion to conveyor 5 in the direction of the double ended arrow on FIG. 3. After a stack row has been removed from conveyor 5, the stacks departing in the direction of the arrow on FIG. 4, conveyor 5 will be returned to the position shown where it is located immediately in front of the lower roller 11.

An upper belt 29 is located above conveyor 5 and driven in synchronism therewith. Upper belt 29 engages the top of a stack 1 or stack row 1a which has been transferred onto conveyor 5 and prevents the stack(s) from shifting during the outfeed operation. Means, not shown in the drawings, are provided to raise upper belt 29 during the time a stack row 1a is being transferred from the palletized storage onto the conveyor 5. During the outfeed operation, belt 29 will be resiliently biased against the stacks 1 which comprise the stack layer being moved on conveyor 5.

As should be obvious, as a result of friction, the upper interleaf 4 associated with the stack layer immediately below the layer from which stacks are being delivered to conveyor 5, this upper interleaf 4 functioning as a sliding surface, has a tendency to move with the abutting lower interleaf 3. Accordingly, a gripping device 30 is provided for engaging the projecting edge region of the upper interleaf 4 of the next lower stack layer. The gripping device 30 shown in FIGS. 3 and 4 is provided with a pair of opposing jaws which are operated by control means, not shown. The mechanical gripper 30, depicted in FIGS. 3 and 4 may, of course, be replaced by some other form of gripping device such as, for example, a suction rail. After a complete stack layer has been removed, the gripping device 30 will be caused to release the upper interleaf 4 which it has engaged, and the pallet will then be lifted until a following stack layer 1b, as a result of its contact with the hold-down belts 22, causes the sensor 23 to be activated. This activation will cause, among other things, the gripping device 30 to engage the projecting edge region of the upper interleaf 4 associated with the next lower stack layer.

Referring to FIG. 4, displacement of the rollers 11 and 18 in the direction of displacement of conveyor 5, as produced by the fluidic actuators 27, may be affected by means of a further fluidic actuator 25. This displacement of rollers 11 and 18 enables the vertically moving projecting edge regions of the interleaves 3 to pass as a new stack layer is being positioned against the hold-down belts 22 for removal.

After removal of the last stack layer 1b, the empty pallet 2 will be returned by lifting device 10 to the lower travel limit of the lifting device. The empty pallet may then be removed and replaced by a loaded pallet. In order to reduce idle time, the full pallet can be positioned on the support plate 9 while a last stack layer is being removed from the previously delivered pallet. This mode of operation is implemented by providing means for engaging and supporting a pallet at its uppermost limit of travel so that the lifting plate 9 may descend free of the pallet. The empty pallet is thereafter withdrawn from the raised position.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for the palletized storage of stacks of flexible products in continuous-layer succession, the products being substantially flat and thin, said method comprising the steps of:

positioning a pallet so that a first surface thereof may receive stacks of the products to be stored;

delivering a first flexible lower interleaf sheet into contact with the first surface of the pallet whereby a portion of a first surface of the first interleaf abuts the first surface of the pallet;

delivering at least a first stack of the products into contact with the second surface of the first lower interleaf;

advancing the first lower interleaf across the first surface of the pallet to thereby cause the synchronised movement of the lower interleaf and first stack of products;

positioning a first flexible upper interleaf sheet over the first stack of products so that a first surface of the first upper interleaf contacts the products and the first stack of products is sandwiched between flexible lower and upper interleaves;

delivering a second flexible lower interleaf sheet into contact with a portion of the first upper interleaf, a first surface of the second lower interleaf abutting the second surface of the first upper interleaf; and delivering at least a second stack of the products onto the second surface of the second lower interleaf whereby the first and second stacks of products will be separated by a pair of flexible interleaves and the second stack of products and second lower interleaf may be moved together relative to the first stack of products and the first upper interleaf.

2. The method of claim 1 wherein the step of positioning the first upper interleaf sheet comprises:

delivering a first flexible upper interleaf sheet to the top of the first stack of products; and advancing the first upper interleaf in synchronism with the first lower interleaf.

3. The method of claim 2 wherein the step of delivering the first stack of products into contact with the second surface of the first lower interleaf includes:

positioning the first stack of products so that a leading edge region of the first lower interleaf projects beyond the first stack of products; and wherein the step of advancing the first lower interleaf to cause the synchronized movement of the first lower interleaf and first stack of products includes:

exerting a pulling force on the leading edge region of the first lower interleaf.

4. The method of claim 2 wherein the pallet is moved in a direction transverse to the direction of advancement of the first lower interleaf, first upper interleaf and stacks after a first layer of stacks of products has been formed on the pallet and wherein the steps of delivering and advancing are repeated to form at least a two layer stack with an upper and a lower interleaf sandwiched between the layers in abutting relationship, and wherein said method further comprises:

restraining the upper interleaf associated with the stack layer disposed immediately below the stack layer being formed against motion in the advancement direction during the steps of delivering and advancing performed during formation of the second and any subsequent layers.

5. The method of claim 2 wherein the step of delivering the first stack of products into contact with the second surface of the first lower interleaf includes:

positioning the first stack of products so that a leading edge region of the first lower interleaf projects beyond the first stack of products; and wherein the step of advancing the first lower interleaf, first upper interleaf and stack in synchronism includes:

exerting a pulling force on the leading edge region of the first lower interleaf.

6. The method of claim 5 wherein the pallet is moved in a direction transverse to the direction of advancement of the first lower interleaf, first upper interleaf and stacks after a first layer of stacks of products has been formed on the pallet and wherein the steps of delivering and advancing are repeated to form at least a two layer stack with an upper and a lower interleaf sandwiched between the layers in abutting relationship, and wherein said method further comprises:

restraining the upper interleaf associated with the stack layer disposed immediately below the stack layer being formed against motion in the advancement direction during the steps of delivering and advancing performed during formation of at least the second layer.

7. The method of claim 1 wherein the step of delivering the first lower interleaf sheet includes guiding the sheet around a short radius.

8. The method of claim 3 further comprising the depalletizing of stacks of products supported on a pallet, the depalletizing including:

clamping the uppermost stack of products on the pallet between abutting upper and lower interleafs;

impairing movement to the lower and upper interleaves which abut the uppermost stack of products on the pallet to cause the uppermost stack of products to move along a travel path in the direction of a leading edge portion of the said interleaves;

diverting the said moving lower and upper interleaves away from said travel path at a point displaced from vertical registration with the pallet; and withdrawing the stacks of products row-by-row after separation of said upper and lower interleaves therefrom.

9. The method of claim 4 wherein each step of delivering an upper interleaf sheet includes:

leaving a trailing edge portion of the upper interleaf which projects beyond the last stack of products in each layer, the projections of the upper interleaves being in a direction opposite to the direction of advancement.

10. The method of claim 9 wherein the step of restraining comprises:

engaging the projecting trailing edge portion of the upper interleaf.

11. The method of claim 10 further comprising the depalletizing of stacks of products supported on a pallet, the depalletizing including:

sequentially moving the lower and upper interleaves and the stacks of products positioned therebetween relative to the pallet along a travel path in the direction of a leading edge portion of the said lower interleaves;

diverting each of the said lower and upper interleaves away from the travel path at a point displaced from vertical registration with the pallet; and withdrawing the stacks of products row-by-row after separation thereof from the said lower and upper interleaves, diverting the lower and upper interleaves associated with the stack layer being moved along the travel path away from the travel path; and withdrawing the stacks of products row-by-row after separation of the interleaves therefrom.

12. Method of claim 1 wherein the step of delivering the first lower interleaf includes:

withdrawing the interleaf sheet from a magazine.

13. The method of claim 11 wherein the steps of delivering the lower and upper interleaf sheets includes withdrawing the sheets from magazines and wherein said method further comprises:

transmitting the diverted lower and upper interleaves to separate magazines.

14. Apparatus for storing stacks of substantially flat and thin flexible products on a pallet comprising:

means for supporting and moving a pallet with a first surface thereof disposed in a generally first horizontal plane, said supporting means controllably moving the pallet in a generally vertical direction;

conveyor means for delivering the stacks of products to be palletized, said conveyor means defining a second horizontal plane located at a level which corresponds to a vertical loading position of a pallet supported by said lifting means;

means for transferring stacks of the products from said conveyor means onto a pallet supported at the loading position, said transferring means including spacially displaced upper and lower transport rollers;

means for positioning a lower interleaf sheet of flexible material between said lower transport roller and a stack of products being transferred from said conveyor means;

means for engaging a leading edge region of a said positioned lower interleaf sheet and pulling said lower interleaf sheet across the upper surface of a pallet supported at the loading position by said lifting means, said pulling means being synchronized with said transfer means whereby the lower interleaf sheet and stack of products will be simultaneously advanced across the surface of the pallet;

means for delivering an upper interleaf sheet between said upper transport roller and a stack of products being transferred from said conveyor means, said means for delivering the upper interleaf sheet feeding said sheet in synchronism with the advancement of said lower interleaf sheet whereby stacks of products transferred from said conveyor means will be sandwiched between interleaf sheets and a pair of interleaf sheets will be provided between successively formed layers of stacks of products formed on the pallet; and means for engaging the upper interleaf sheet associated with the layer of stacks of products next previously formed to restrain the engaged interleaf sheet against motion as the lower interleaf sheet associated with the layer of stacks of products being formed is advanced whereby the layers of stacks being formed with its associated interleaves will slide over the upper interleaf of the previously formed layer of stacks of products.

15. The apparatus of claim 14 wherein said means for delivering the upper interleaf sheets causes a trailing edge portion of the upper interleaf sheets to extend beyond the layer of stacks of products, said trailing edge portions being gripped by said engaging means.

16. The apparatus of claim 15 wherein said means for positioning said lower interleaf sheet includes:
a magazine for storing lower interleaf sheets;
means for withdrawing individual lower interleaf sheets from said magazine; and
means for causing the withdrawn lower interleaf sheets to be turned through a short radius when being directed to said lower transport roller by said positioning means.

17. Apparatus for depalletizing stacks of flat and thin flexible products which have been stored in layers on a first surface of a pallet, adjacent layers of said product stacks being separated by a pair of abutting flexible interleaf sheets, the first of said interleaf sheets of each pair being a lower interleaf sheet associated with an upper stack layer and the other of said interleaf sheets of each pair being an upper interleaf sheet associated with the adjacent lower stack layer, said lower and upper interleaf sheets respectively having an edge region which projects outwardly beyond a substantially vertical side of the multilayer arrangement of stacks on the pallet, the projecting edges of the upper and lower interleaf sheets being at opposite sides of the multilayer arrangement, said apparatus comprising:
means for supporting and moving the pallet with the first surface thereof disposed in a generally first horizontal plane, said supporting means controllably moving the pallet in a generally vertical direction;
conveyor means for receiving stacks of products transferred from the pallet, said conveyor means defining a second horizontal plane located at a level which corresponds to a vertical unloading position of a pallet supported by said lifting means, said conveyor means being movable toward and away from said lifting means;
means for transferring stacks of the products from a pallet supported at the loading position onto said conveyor means, said transferring means including spacially displaced upper and lower transport rollers, said transferring means further including means for engaging the projecting edge region of a lower interleaf sheet and applying a pulling force to said lower interleaf sheet to thereby cause the stacks of products in contact with said lower interleaf sheet to move into engagement with said transport rollers;
means for engaging the projecting edge portion of the upper interleaf sheet associated with the layer of stacks disposed immediately below the layer being transferred from the pallet to restrain the thus engaged upper interleaf sheet against motion as the lower interleaf sheet associated with the layer of stacks of products being removed from the pallet is advanced whereby the layer of stacks being removed with its associated interleaves will slide over the upper interleaf of the next adjacent lower layer of stacks of products on the pallet; and
means for removing the upper interleaf sheet associated with the layer of stacks of products being transferred from the pallet.

18. The apparatus of claim 17 further comprising:
means for holding the upper interleaf sheet associated with the layer of stacks of products being transferred from the pallet against the tops of the stacks comprising said layer, said holding means causing said upper interleaf sheet to pass under said upper transport roller with the stacks of products, said upper interleaf sheet being engaged by said removing means downstream from said upper transport roller in the direction of said conveyor means.

* * * * *